UNITED STATES PATENT OFFICE.

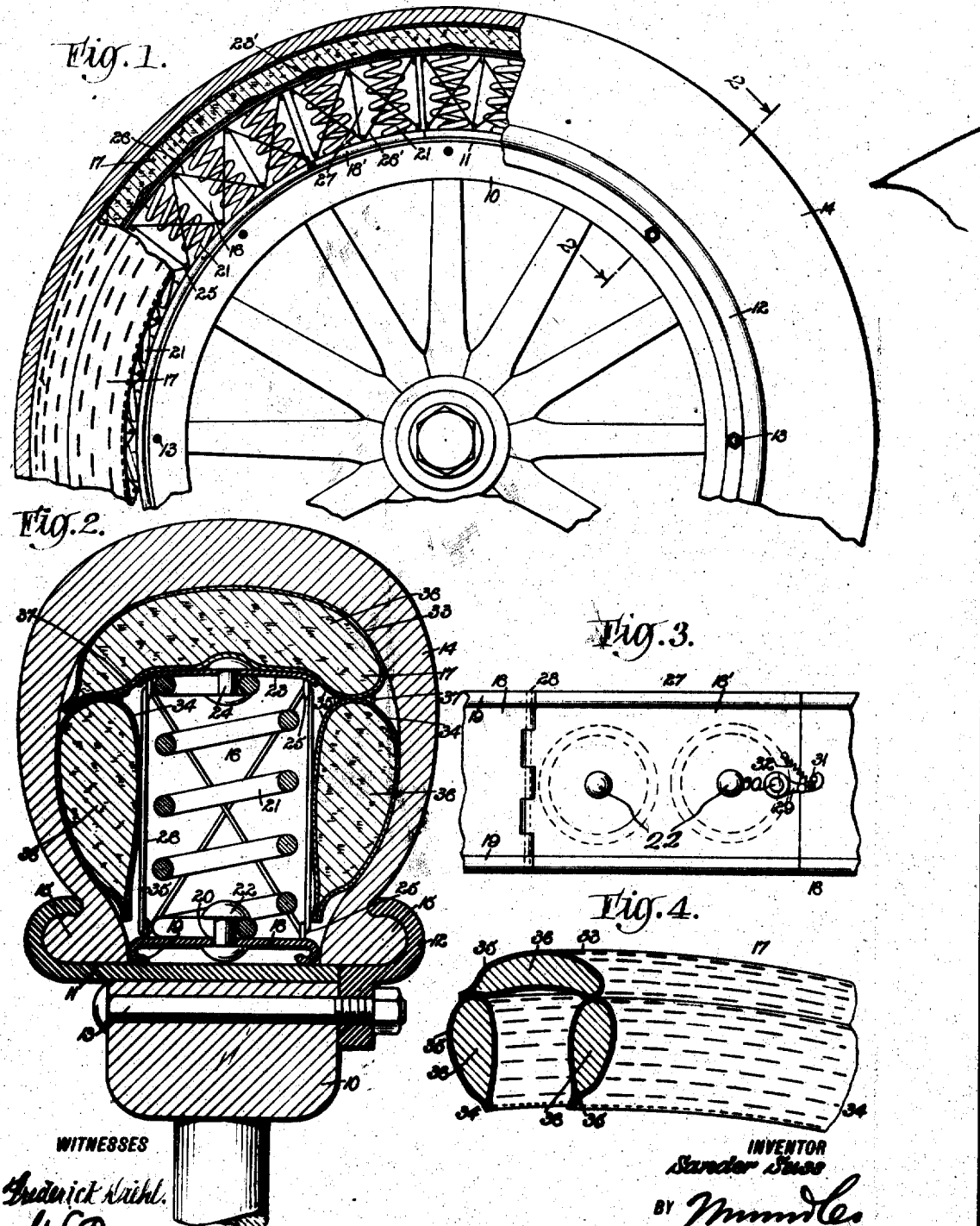

SANDER SUSS, OF NEW YORK, N. Y.

RESILIENT TIRE.

1,229,166. Specification of Letters Patent. Patented June 5, 1917.

Application filed December 29, 1916. Serial No. 139,493.

*To all whom it may concern:*

Be it known that I, SANDER SUSS, a citizen of the United States, and a resident of the city of New York, borough of Manhattan, in the county and State of New York, have invented a new and Improved Resilient Tire, of which the following is a full, clear, and exact description.

This invention relates to resilient tires adapted especially for vehicles and has particular reference to a tire construction designed primarily for the purpose of taking the place of the usual and troublesome inflatable inner tube.

Among the objects of the invention is to provide a resilient tire in which there is provided an annular band made preferably of metal and having secured thereto an annular series of radially disposed metal springs constituting what may be termed a cushioning device or cushion adapted to be carried within a resilient shoe of conventional form or construction and held in place thereby upon the central portion of the usual tire supporting rim.

Another object of the invention is to provide a novel form or construction of filler or padding substantially filling the space between the cushion and the inner wall of the shoe.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation partly in section indicating my improved construction applied to a wheel;

Fig. 2 is a vertical transverse section of the same on the line 2—2 of Fig. 1;

Fig. 3 is an inner face view of the cushion band or base indicating the hinged section and means for locking it closed; and Fig. 4 is a perspective view of a detail of the filler above referred to.

Referring now more particularly to the drawings, I show a wheel of any suitable or conventional design including a felly 10 and rim 11 having a detachable portion 12, the parts being held together by bolts 13 or their equivalent. The parts thus far specified are or may be of standard construction and adapted to hold in place the resilient tire construction which includes a shoe 14 similar to the pneumatic shoes commonly used, shown herein as including clencher beads 15 interlocking in the flanged portions of the rim 11 and portion 12.

My present invention has reference to the structure within the shoe whereby I am able to dispense satisfactorily with the usual pneumatic inflatable tube. This construction includes two principal parts, the above referred to cushion 16 and a filler or padding 17.

The cushion comprises an inner rigid metal band 18 formed preferably of sheet metal and having its parallel edges bent downwardly or inwardly forming beads 19 of tubular construction which are adapted to bear upon the outer surface of the cylindrical portion of the standard rim 11. This band 18 is provided with a circular series of radial holes 20 arranged in the vertical central plane of the wheel. Another portion of the cushion consists of a series of radially disposed coil springs 21 of any suitable material, design or construction, the inner end of each of which is locked to the band 18 by means of a rivet 22 or other equivalent fastener passing through the hole 20, one head or end of the rivet lying within the space between the parts 18 and 11. 23 indicates an outer band connected to the outer ends of the springs by means of rivets 24, or the like, somewhat similar to the fasteners 22. The bands 18 and 23 on their opposing faces are provided with a multiplicity of eyes or hooks 25, through all of which is laced a stout flexible cable 26 of any suitable construction. This cable provides a means to flexibly control the lateral or circumferential movement of the outer band 23 with respect to the inner band 18, in addition to the springs 21. The primary function of the springs 21 is to keep the two bands of the cushion separated but permitting them to approach each other under ordinary practice. The primary function of the cable, on the other hand, is to limit the relative lateral or circumferential movement of the bands. The cushion comprises also a short relatively movable section 27 having a construction similar to that of the main portion of the cushion including inner and outer band portions 18' and 28', springs 21, and a lacing cable 26'. When the tire devices are separated from the standard wheel rim, the resiliency of the main portion of the cushion tends to separate the parts thereof which abut against the hinged section 27 so that there is no difficulty in swinging the section 27 as a whole inwardly around the axis of its hinge 28. 29 indicates a latch pivoted at 30 upon the free end of the movable section 18' and coöperating with a pin 31 carried by the adjacent end of the band 18, a spring 32 acting on the latch to hold it in engaging position. By this means, the spreading of the cushion circumferentially is prevented and therefore the swinging movement of the movable section around its hinge 28 is prevented.

The filler or padding 17 comprises a plurality of circumferential sections, shown herein as three in number, one of which is a tread member 33 and the other two of which 34 are side members. Each of these members comprises a flexible jacket 35 of endless construction and filled with ground cork 36 or its equivalent having some flexibility and considerable body, serving to give form to the tire as a whole, whereby it simulates in appearance the standard pneumatic tire. The tread member 33 lies against the outer band 28 and fills the space between the same and the tread portion of the shoe 14. The side or wing members 34 are packed fairly snugly between the side portions of the shoe and the zigzag lateral lacings of the cable 26. Each filler section is stitched or hinged circumferentially along one edge to the next adjacent section, as indicated at 37, but in practice, the two abutting edges of the adjacent sections practically fill all the space between the cushion and the inner wall of the shoe.

This device has been found in practice to be very efficient, both as to resiliency and durability. The manner of manipulation is practically as follows: With the standard shoe or its equivalent 14, the filler member is introduced and then the cushion is introduced within the filler, the movable section 27 thereof being swung inwardly, and by means of some power device, the adjacent ends of the main portion of the cushion are caused to approach each other as closely as necessary to admit the cushion into the cavity within the filler. The ends of the main portion of the cushion are then released permitting the cushion to expand, such expansion being carried far enough by suitable means to permit the movable section 27 to swing outward into alinement with the other main portion of the cushion, where it will be locked after the free end of the main portion of the cushion is brought up against the free end of the movable portion. The tire device then complete is ready to be slipped upon the rim 11 and locked in any usual or approved manner and is ready for action. The cushion and filler devices are both strong as well as resilient and are not liable to damage due to road wear. Since there is practically no possibility of collapse of the tire, the shoe itself is much less liable to be rim cut or otherwise prematurely disabled than in the usual pneumatic construction.

I claim:

1. In a resilient tire, the combination with a flexible shoe, of an annular cushion member comprising inner and outer bands, a circular series of radially disposed springs having their ends secured to said bands, a stout flexible cable laced circumferentially and transversely between the inner and outer bands to limit the relative lateral and circumferential movement thereof, and padding devices between the cushion member and the inner wall of the shoe substantially filling the space therebetween.

2. The herein described resilient tire construction comprising in combination a tough flexible shoe, a spring cushion within and spaced from the same and a padding device filling the space between the cushion and the inner wall of the shoe, said padding device comprising a plurality of annular sections, each section being hinged to the next along its edge and each section comprising a flexible jacket and a body of suitable light porous material.

3. The herein described cushioning device for resilient tires comprising inner and outer parallel bands having an opening, each of the bands carrying on its face adjacent to the other band a multiplicity of eyes and both of the bands being provided with circumferential series of holes arranged in radial pairs and in the central plane of the tire, a circumferential series of springs extending between the bands and secured in said pairs of holes, a cable of strong flexible material laced through said eyes in diagonal direction both circumferentially and laterally to limit the relative circumferential and lateral movement of the bands, and a movable section filling the said opening, said movable section comprising inner and outer band portions, radial springs, and flexible cable lacings, substantially as set forth.

4. The herein described spring cushion for resilient tires comprising a metal band formed of sheet metal and having tubular edge beads turned inwardly toward the center of the wheel, said band having an opening, spring members secured to the central portion of said band, the securing means extending through the band into the space between the beads, and a movable band section hinged at one end to one end of the first band and movable inwardly toward the center thereof and also outwardly to complete the main band, latch devices extending between the free ends of the main band and movable section to hold them in alinement, and means coöperating with the outer ends of all of the spring elements to retain the same in operative relation to the inner band.

SANDER SUSS.